Feb. 24, 1959 J. K. DOLIVA 2,875,321

TELEVISION CABINET LIGHTING FIXTURE

Filed Aug. 4, 1955

INVENTOR.
JOSEPH K. DOLIVA

United States Patent Office 2,875,321
Patented Feb. 24, 1959

2,875,321

TELEVISION CABINET LIGHTING FIXTURE

Joseph K. Doliva, San Diego, Calif.

Application August 4, 1955, Serial No. 526,450
5 Claims. (Cl. 240—4)

This invention relates to indirect lighting fixtures and more particularly to an indirect lighting fixture for installation on the top or rear of a television cabinet.

Heretofore correct lighting of a room for television viewing has been difficult. Lamps spaced about the room cause glare and reflections from the television screen. Table lamps set near or on the television set provide too great a lighting contrast, resulting in eye strain and fatigue.

The difficulty of obtaining correct lighting is overcome with the lighting fixture comprising this invention. This fixture provides for indirect lighting by reflecting light of selective brilliance on the ceiling of the room from a light source from within the top of the television set or mounted on the rear of the set. Various shades of color as well as brilliance are made available upon rotation of a selection switch.

It is therefore an object of this invention to provide for a television cabinet having its own room illuminating source.

Another object is the provision of a television cabinet having an adjustable room illuminating source.

Another object is the provision of a lighting fixture for installation on the top or rear of a television cabinet.

A further object is the provision of indirect room lighting for television viewing which reduces eye strain and fatigue due to glare, contrast and improper lighting.

A still further object is the provision of a lighting fixture for television viewing that may be conveniently installed on existing television sets and which may be easily included in the manufacture of new sets.

Another object is the provision of a television viewing light fixture having a switch separate from the television operating switch so the fixture may be used as a night light when desired.

Other objects will become apparent as the description of this fixture proceeds with reference to the drawings wherein like numerals refer to like parts throughout the several views.

Figures 1, 2, 3, 4, 5, 6, 7:
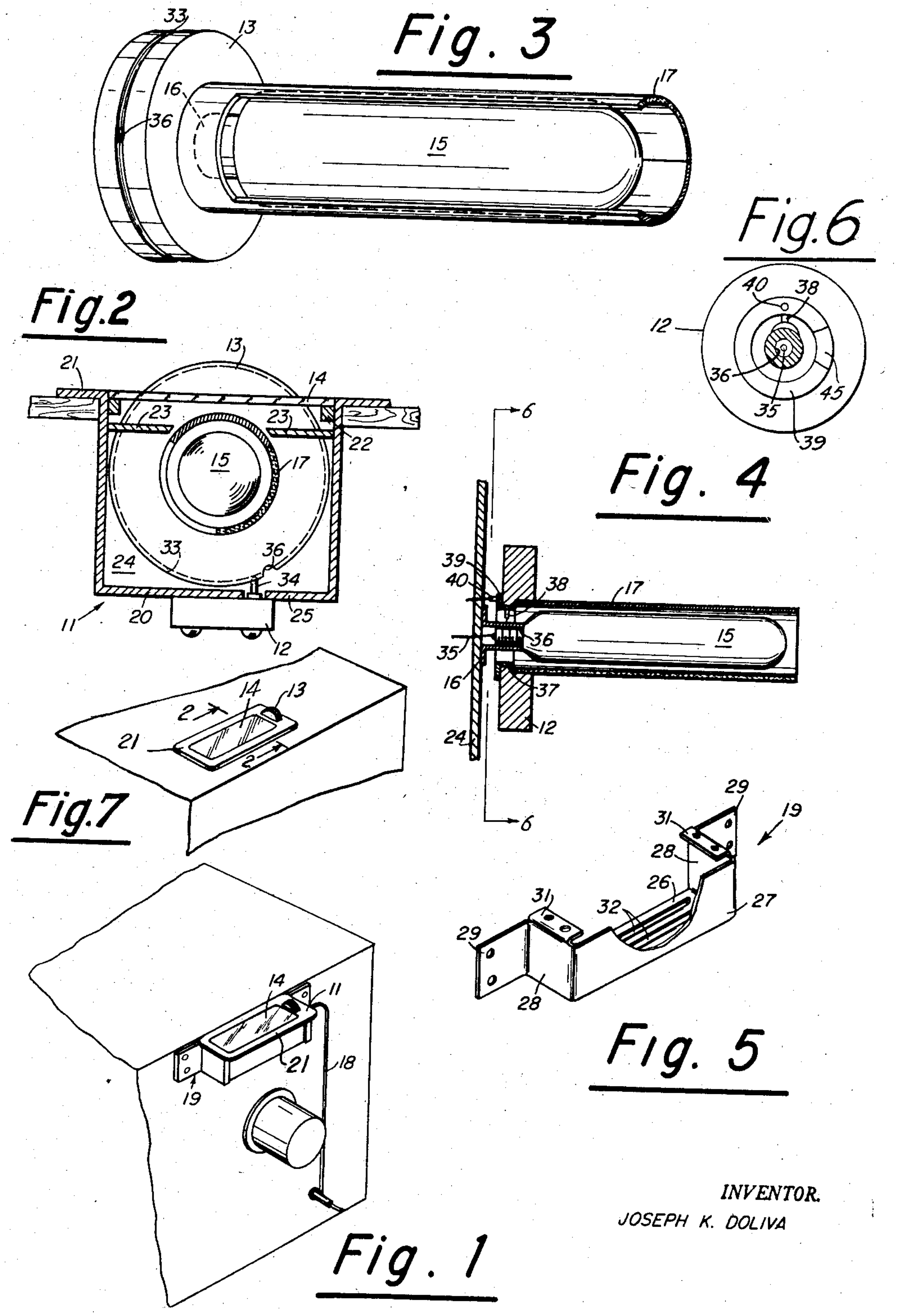
Fig. 1 is a perspective view of a fixture mounted in the back of a television set.
Fig. 2 is a cross-sectional view taken along the line 2—2 of Fig. 7.
Fig. 3 is a perspective view of the lighting element, filter and switch knob before assembly.
Fig. 4 is a cross-sectional view of a modification of the selection switch.
Fig. 5 is a perspective view of a portion of the mounting bracket fastening the fixture to the rear.
Fig. 6 is a sectional view taken along the line 6—6 of Figure 4.
Fig. 7 is a perspective view of a fixture mounted on top of the television set.

Referring now to the drawings wherein like numerals designate like parts throughout the several views, the light fixture comprises a housing 11, switch 12, knob 13, cover 14, light bulb 15, light base 16, filter 17, electric cord 18, and mounting brackets 19 for mounting the fixture at the rear edge of the cabinet when such mounting is desired. The housing 11 comprises an end portion 20 for holding the micro-switch 12, control knob 13, bulb 15, bulb base 16, and filter 17, a mounting flange portion 21, side portions with projections 22 for supporting glass cover 14, and ribs 23 for blocking stray light from shining through the glass cover 14. The end portion 20 has a wall 24 to support the light base 16 and bottom 25 to which is mounted the microswitch 12. The other end portion and bottom of housing 11 is open to permit heat from bulb 15 to escape.

The mounting bracket 19, best shown in Fig. 5, comprises a bottom 26, side 27, ends 28, mounting plates 29 and fixture connecting flanges 31. In the bottom 26 are inwardly directed air vents 32 which permit air circulation and cooling without escape of too much light from the bulb 15. The lighting fixture may be mounted in a suitable opening in the top of the cabinet as shown in Figure 7. In this type of use the mounting bracket 19 is not used since the flanges 21 extending over the opening edges will support the fixture as shown in Figure 2. However, when the fixture is mounted on the rear wall, the mounting bracket 19 is used and is secured to the rear wall as shown in Figure 1. The fixture is mounted within the bracket 19 with flanges 21 of the fixture resting on the connecting flanges 31 of the bracket. Of course either or both installations may be used as desired.

Control knob 13 revolves around light base 16. In the center of the edge of the knob is a grooved path 33 into which contact 34 of micro-switch 12 rides upon rotation of the knob. At one point on the path is a recessed portion 36 which permits contact 34 to move upwardly, disengaging contacts within micro-switch 12 and turning the light off.

In the modification shown in Fig. 4, light base 16 is secured to the wall of the housing as before. The bulb 15 in the conventional manner makes electrical contact with the center contact 35 and the threaded wall 36 of base 16. Doughnut shaped switch 12 is fitted with a metallic slotted collar 37 which maintains contact with threaded wall 36 by means of a spring urged brush 38 mounted on the upper outer surface of wall 36. When switch 12 is fitted over the base 16, the weight of the switch bearing down on brush 38 assures further contact. Collar 37 has a flanged portion 39 which maintains electrical contact with brush 40 fastened to wall 24. The electrical circuit for lighting the bulb is now complete. The circuit may be broken by rotating the switch 12 until either brush 40 or brush 38 or both contact the slotted non-conducting area 45 of the collar, in Fig. 6, which insulates the electrically conductive portion of the brushes from the collar. This turns the light off.

The light filter 17 comprises a cylindrical sleeve which fits over the bulb 15 and is mounted for rotary movement with knob 13. It is divided into radial segments of a width equal to the spacing between light blocking ribs 23. Each segment has a different color or light intensity so that the indirect light may have a selective colored appearance or desired brilliance. One segment is clear, and may be removed if desired to permit air circulation and heat escape. The number of segments, and therefore color or intensity selections, depends upon the spacing between ribs 23 and the size of the filter 17.

Glass cover 14 rests on projections 22 and is flush with flanges 21 and the top of the set.

The electric cord 18 is preferably connected to the television set household power supply cord or may be connected to some convenient electric outlet. In this way the light fixture may be used as a night light when the television set is turned off. Of course, other connections are possible, such as by connecting the light 15 to the "on-off" switch of the set. In this case the light comes on automatically when the set is used but not otherwise. Other types of doughnut shaped switches may be used if desired. The housing may be of metal, plastic or other suitable material adaptable to molding, stamping, casting, or machining. The filter may be of glass or plastic and the coloring may be done by inking, dyeing, or insertion of colored light passing material.

Other modifications and variations of the present invention are possible in the light of the above teachings. It is therefore to be understood that within the scope of the appended claims the invention may be practiced otherwise than as specifically described.

What is claimed is:

1. In combination, a television cabinet adapted for viewing from the front thereof, an elongated opening on the top surface of said cabinet having one edge near and parallel to the rear edge thereof, a housing within said opening having flanged portions extending thereover and supporting said housing thereby, said housing having a control knob attached thereto, a light means within said housing with a light filter between said light means and the top surface of said cabinet, said control knob being connected to said filter to selectively move portions of said filter over said light means and means on said knob to actuate said light means.

2. In combination, a television cabinet with an opening in the top surface of said cabinet near the rear edge thereof, a light filter means, a housing within said opening containing and supporting said light filter means, a light source beneath said filter means, said filter means including means to selectively vary the color and brilliance of light being emitted from said opening by said light means, said selective means including a control knob for selectively moving portions of said filter means over said light source and means on said knob to actuate said light source.

3. Indirect room illuminating means comprising a housing with an opening in the top surface thereof, light passing cover means covering said opening, a light source beneath said opening, a cylindrical light filter rotatably mounted in said housing around said light source, said light filter having color and light intensity filtering portions spaced thereon for selective filtering as said filter is rotated, a control knob connected to said filter for rotating said filter, shielding means in said housing for blocking out light passing through the non-selected filtering portions, and means operable by said control knob for turning said light source on and off, and bracket means for mounting said housing to a vertical wall and excluding light not being emitted from said opening comprising one side, bottom and two end walls, inwardly directed air ventilating means in said bottom, mounting brackets extending outwardly from said end walls, and inwardly directed flanges on said end walls supporting said housing.

4. Indirect room illuminating means comprising a housing with an opening in the top surface thereof, light passing cover means covering said opening, a light source beneath said opening, a cylindrical light filter rotatably mounted in said housing around said light source, said light filter having color and light intensity filtering portions spaced thereon for selective filtering as said filter is rotated, a control knob connected to said filter for rotating said filter, shielding means in said housing for blocking out light passing through the non-selected filtering portions and means operable by said control knob for turning said light source on and off, said control knob comprising a doughnut shaped ring rotatably mounted around said light source, a grooved path over the surface of said ring, a recess in said path, said means operable by said control knob for turning said light source on and off comprising an open-close switch having an operating projection thereon, said switch being mounted on said housing so that said projection fits into said grooved path on said control knob, said recess in said grooved path permitting outward movement of said projection thereby turning said light source to off position.

5. Indirect room illuminating means comprising a housing with an opening in the top surface thereof, light passing cover means covering said opening, a light source beneath said opening, a cylindrical light filter rotatably mounted in said housing around said light source, said light filter having color and light intensity filtering portions spaced thereon for selective filtering as said filter is rotated, a control knob connected to said filter for rotating said filter, shielding means in said housing for blocking out light passing through the non-selected filtering portions, means operable by said control knob for turning said light source on and off, a light source base mounted in said housing, said control knob being doughnut shaped and rotatably mounted about said base, said means operable by said control knob comprising a collar of electrically conducting material centrally mounted within said knob and rotatable therewith, said collar having a portion therein of insulating material, a first contacting brush making electrical contact between said base and said collar, a second contacting brush mounted on said housing and making electrical contact with said collar, said collar being operable by rotation of said knob to rotate and break electrical contact with said brushes as the insulated portion of said collar passes thereover.

References Cited in the file of this patent

UNITED STATES PATENTS

| | | |
|---|---|---|
| 1,392,497 | Harmer | Oct. 4, 1921 |
| 1,887,288 | Clausen | Nov. 8, 1932 |
| 2,261,536 | Wood | Nov. 4, 1941 |
| 2,298,870 | Cooper | Oct. 13, 1942 |
| 2,301,419 | Lew | Nov. 10, 1942 |
| 2,591,419 | Gheorghiv | Apr. 1, 1952 |
| 2,607,873 | Sheidler | Aug. 19, 1952 |
| 2,612,133 | Crawford | Sept. 30, 1952 |
| 2,699,492 | Cookenboo | Jan. 11, 1955 |
| 2,707,780 | Heller et al. | May 3, 1955 |